United States Patent
Breslin et al.

(10) Patent No.: US 8,665,869 B2
(45) Date of Patent: Mar. 4, 2014

(54) SYSTEM, APPARATUS, AND METHODS FOR INSERTING INFORMATION INTO CAPTURED DATA PACKETS

(75) Inventors: Terence M. Breslin, San Mateo, CA (US); David Kucharczyk, Sante Fe, NM (US); Jan Allen Hinshaw, Prescott Valley, AZ (US)

(73) Assignee: VSS Monitoring, Inc., Sunnyvale, CA (US)

( * ) Notice: Subject to any disclaimer, the term of this patent is extended or adjusted under 35 U.S.C. 154(b) by 539 days.

(21) Appl. No.: 12/959,226

(22) Filed: Dec. 2, 2010

(65) Prior Publication Data

US 2011/0128974 A1    Jun. 2, 2011

Related U.S. Application Data

(60) Provisional application No. 61/266,091, filed on Dec. 2, 2009.

(51) Int. Cl.
*H04L 12/28* (2006.01)
(52) U.S. Cl.
USPC .......................... 370/389; 370/252; 370/474

(58) Field of Classification Search
USPC ......... 370/229, 230, 252, 351, 359, 389, 392, 370/393, 395.71, 413, 419, 474
See application file for complete search history.

(56) References Cited

U.S. PATENT DOCUMENTS

| | | | |
|---|---|---|---|
| 2004/0044941 A1* | 3/2004 | Hatley | 714/752 |
| 2004/0179509 A1* | 9/2004 | Lev et al. | 370/349 |
| 2005/0047411 A1* | 3/2005 | Kadambi et al. | 370/389 |
| 2005/0278565 A1* | 12/2005 | Frattura et al. | 714/5 |
| 2006/0251084 A1* | 11/2006 | Elliot | 370/398 |
| 2007/0002848 A1* | 1/2007 | Kudou et al. | 370/378 |
| 2010/0080249 A1* | 4/2010 | Li et al. | 370/503 |
| 2010/0128726 A1* | 5/2010 | Takakuwa | 370/390 |

* cited by examiner

*Primary Examiner* — Kwang B Yao
*Assistant Examiner* — Nguyen Ngo
(74) *Attorney, Agent, or Firm* — Edwards Wildman Palmer LLP; Scott D. Wofsy; Christopher J. Capelli

(57) ABSTRACT

Systems, apparatus, and methods for inserting information into a captured data packet included in a traffic flow of captured data packets are herein disclosed. Exemplary information inserted into a capture data packet includes a data segment, a time stamp, port stamp, a virtual local area network (VLAN) tag, Gateway General Packet Radio Service (GPRS) Tunneling Protocol (GTP) information, and multi-protocol label switching (MPLS) information.

6 Claims, 14 Drawing Sheets

301

| Header 315 | Payload 320 | FCS/CRC 322 |

| Header 315 | Payload 320 | Port Stamp 330 | New FCS/CRC 325 |

FIG. 3B

| 303 | Header 315 | Payload 320 | Time Stamp 335 | New FCS/CRC 325 |

FIG. 3C

| 304 | Header 315 | Payload 320 | Time Stamp 335 | Port Stamp 330 | New FCS/CRC 325 |

| Header 315 | Predefined Segment 340 | New FCS/CRC 325 |

| Header 315 | New Data Segment 345 | Payload 320 | New FCS/CRC 325 |

FIG. 3H

| Header 315 | Modified Predetermined Segment 350 | Payload 320 | New FCS/CRC 325 |

SYSTEM, APPARATUS, AND METHODS FOR INSERTING INFORMATION INTO CAPTURED DATA PACKETS

RELATED APPLICATION

This application is a NONPROVISIONAL of, claims priority to, and incorporates by reference U.S. Provisional Patent Application 61/266,091, filed 2 Dec. 2009.

FIELD OF THE INVENTION

The present invention relates to systems, apparatus, and methods for inserting information into a captured data packet included in a traffic flow of captured data packets.

BACKGROUND

In conventional communication networks, a traffic flow of data packets transmitted through the communication network may be captured and forwarded to a network tap device. The network tap device then forwards the full traffic flow of captured network traffic, as received, to an external monitoring device. This transmission of the full traffic flow of captured network traffic to external monitoring devices has many drawbacks.

For example, many external monitoring devices are specialized such that they analyze and/or monitor only specific segments of a captured data packet or types of captured traffic. Thus, these specialized external monitoring devices need to receive only relevant captured data packet segments or types of captured traffic. Receipt of the full traffic flow of captured network traffic serves to require the specialized external monitoring devices to filter out irrelevant information from the full traffic flow of captured network traffic prior to executing it's analysis and or monitoring functions. This filtering causes results in an increased burden on the resources, such as bandwidth and processing time, on both the communication network and the network tap.

Another drawback to transmission of unmodified captured traffic flows results when inappropriate information is transmitted to an external monitoring device. For example, when the external device is a telecommunications monitor attempting to monitor the quality-of-service for a telecommunicated conversation between two individuals, receipt of the all data included in the conversation may be an unnecessary use of bandwidth and, in a case where receipt of all data included in the conversation is of a violation of wire-tapping laws, illegal.

A further drawback to the transmission of unmodified captured traffic occurs because the external monitoring devices are not aware of an originating port for captured network traffic or when, either sequentially or chronologically, captured network traffic enters into the communication network and/or network tap.

SUMMARY

Systems, apparatus, and methods for inserting information into a captured data packet included in a traffic flow of captured data packets are herein disclosed. The traffic flow of captured data packets may be received by a network captured traffic distribution device via, for example, a mirror port resident on a source of the captured data packets and/or a traffic capture point located along a communication link between two communicating devices.

A data packet included in the traffic flow of captured data packets may be analyzed in order to locate an insertion point for a new data segment to be inserted into the data packet. Analysis of the data packet may include counting a specified number of bytes into the data packet.

A new data segment may then be inserted into the data packet. Exemplary new data segments include time stamps, port stamps, a virtual local area network (VLAN) tag, Gateway General Packet Radio Service (GPRS) Tunneling Protocol (GTP) information, and multi-protocol label switching (MPLS) information. In some embodiments, the new data segment includes an even number of bytes.

An egress port assigned to the data packet may be determined. This determination may be based on, for example, configuration information stored at the network captured traffic distribution device. On some occasions, the egress port may be a monitor port. Then, the data packet, including the new data segment, may be transmitted to the assigned egress port.

In one embodiment, when, for example, the network captured traffic distribution device includes a plurality of ingress ports, an ingress port identity associated with a received data packet may be determined. The ingress port identity may indicate an ingress port, of the plurality of ingress ports, via which the data packet may be received at a network captured traffic distribution device.

A port stamp indicating the ingress port identity associated with the received data packet may then be generated and inserted into the data packet. In one embodiment, the port stamp may be an 8-bit user-configurable value. On occasions when the data packet includes at least one of a frame check sequence (FCS) and/or a cyclic redundancy check (CRC), the port stamp may be inserted immediately preceding at least one of the FCS and/or CRC.

An egress port assigned to the data packet may then be determined. This determination may be based on, for example, configuration information stored at the network captured traffic distribution device. On some occasions, the egress port may be a monitor port. Then, the data packet, including the port stamp, may be transmitted to the assigned egress port.

In another embodiment, a time of arrival of a data packet at the network captured traffic distribution device may be determined. A time stamp value may then be generated based on the determination and inserted into the data packet. The generated time stamp value may be based on, for example, a system clock in communication with the network captured traffic distribution device, a port timer associated with an ingress port via which the data packet is received, a difference between a current time of arrival of the data packet and an arrival time of a previously received data packet, a time value received from a system clock, and/or a time value received from a global positioning receiver (GPS Receiver). The time stamp value may be generated by, for example, receiving a value from first and second counters and combining these values. On some occasions, the time stamp value may be adjusted based on a level of accuracy with which time of arrival is determined. When the data packet includes a frame check sequence (FCS) and/or a cyclic redundancy check (CRC), the time stamp may be inserted immediately preceding the FCS or CRC.

An egress port assigned to the data packet may then be determined. This determination may be based on, for example, configuration information stored at the network captured traffic distribution device. On some occasions, the egress port may be a monitor port. Then, the data packet, including the time stamp, may be transmitted to the assigned egress port.

Exemplary network captured traffic distribution devices disclosed herein include a plurality of ingress ports for receiving a traffic flow of captured data packets from a source and a memory. The memory may store instructions executable by an application specific integrated circuit (ASIC), a processor, and/or a field programmable gate array (FPGA). Execution of the instructions may enable the insertion of a new data segment, port stamp, and/or time stamp into a data packet. Execution of the instructions may further enable a determination of an egress port from a plurality of egress ports assigned to the data packet and transmit the data packet to the assigned egress port.

Exemplary systems disclosed herein include a source of a traffic flow of captured data packets, a network captured traffic distribution device, an external device, and one or more communication links. The source may be capable of capturing and/or transmitting the traffic flow of captured data packets along a communication link to the network captured traffic distribution device.

The network captured traffic distribution device may be communicatively coupled to the source via a communication link and may include an ingress port configured to receive the traffic flow of captured data packets and an egress port configured to transmit a captured data packet included in the received traffic flow of captured data packets to an external device. The network captured traffic distribution device may be configured to analyze a data packet included in the traffic flow of captured data packets to, for example, locate an insertion point for a new data segment to be inserted into the data packet, insert the new data segment into the data packet, determine an egress port assigned to the data packet, and/or transmit the data packet, including the new data segment, to the assigned egress port.

The external device may be communicatively coupled to the network captured traffic distribution device via a communication link and may be configured to receive a captured data packet transmitted by the network captured traffic distribution device along the communication link.

BRIEF DESCRIPTION OF THE FIGURES

The present invention is illustrated by way of example, and not limitation, in the figures of the accompanying drawings in which:

FIG. 3A is a block diagram depicting a data packet, in accordance with an embodiment of the present invention;

FIG. 3B is a block diagram of a data packet including a port stamp, in accordance with an embodiment of the present invention;

FIG. 3C is a block diagram of a data packet including a time stamp, in accordance with an embodiment of the present invention;

FIG. 3D is a block diagram of a data packet including a time stamp and a port stamp, in accordance with an embodiment of the present application;

FIG. 3G is a block diagram of a truncated data packet, in accordance with an embodiment of the present application;

FIG. 3H is a block diagram of a data packet including a new data segment, and in accordance with an embodiment of the present application;

FIG. 3I is a block diagram of a data packet including a modified predefined segment, in accordance with an embodiment of the present invention;

WRITTEN DESCRIPTION

At times, it may be desirable to analyze and/or modify captured data packets received by a network captured traffic distribution device in order to, for example, facilitate various functions performed either internally to, or externally from, the network captured traffic distribution device.

Figure 1:
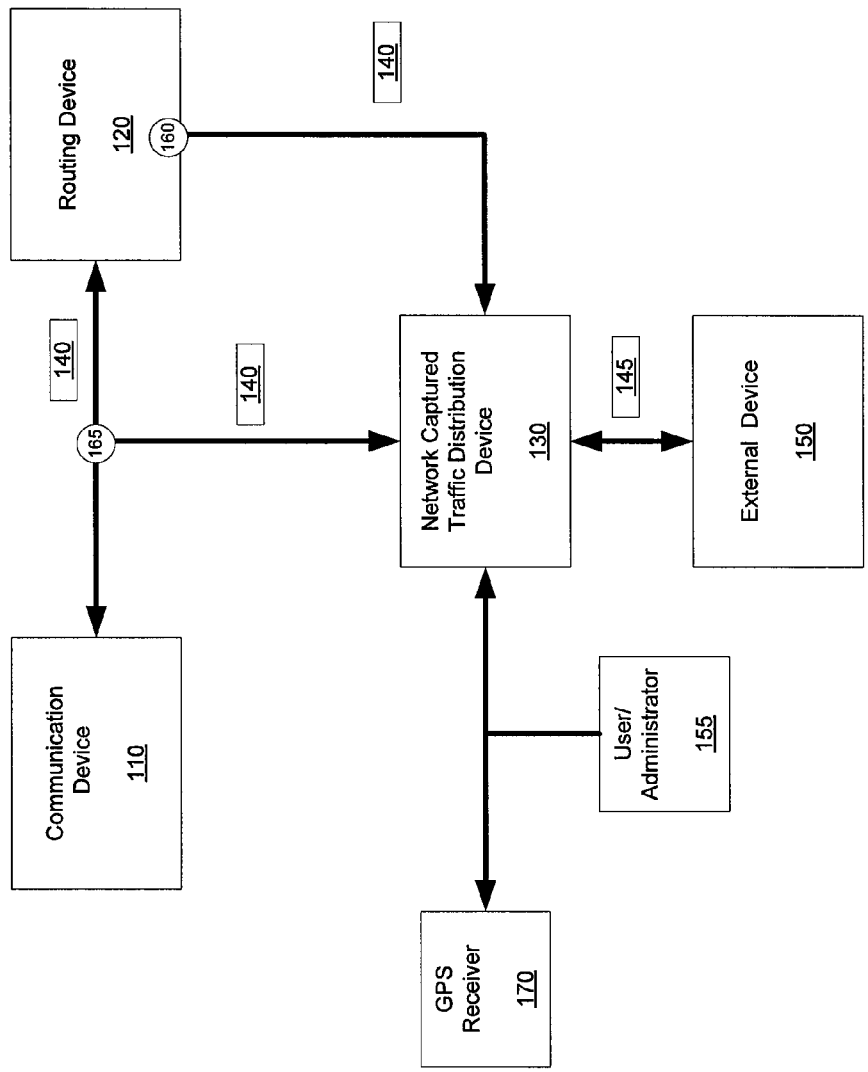
FIG. 1 is a block diagram depicting a network communication system in accordance with an embodiment of a present invention.

FIG. 1 is block diagram depicting a network communication system 100 capable of executing any of the methods herein described. System 100 may be, for example, a telecommunication system such as a Global System for Mobile communication (GSM) system or a multi-protocol label switching (MPLS) system. In some embodiments, system 100 may be Gateway General Packet Radio Service (GPRS) system, an Enhanced Data Rates for GSM Evolution (EDGE) system, an Enhanced GPRS (EGPRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags.

System 100 may include a communication device 110. Exemplary communication devices 100 include personal computers, mobile computing devices, and mobile telephones. Communication device 110 may generate a data packet 140 and transmit data packet 140 to a routing device, such as routing device 120 via a communication link. Routing device 120 may be any router enabled to route data packets through communication system 100.

System 100 may also include a network captured traffic distribution device 130 which may be any network captured traffic distribution device capable of receiving captured network traffic. Network captured traffic distribution device 130 may include a plurality of ingress and egress ports. In some cases, an egress port may be a monitor port. Network captured traffic distribution device 130 may also be communicatively coupled so as to provide information to and/or receive instructions from a user and/or administrator 155. User/administrator 155 may be, for example, a user and/or administrator of, for example, system 100 and/or network captured traffic distribution device 130. User/administrator 155 may communicate, for example, configuration information and/or instructions to network captured traffic distribution device 130.

Network captured traffic distribution device 130 may be communicatively coupled to a mirror port 160 present on routing device 120 via an ingress port and may receive a traffic flow of captured data packets, including data packet 140, from routing device 120 via mirror port 160. Network captured traffic distribution device 130 may also be communicatively coupled to a traffic capture point 165 located along a communication link between communication device 110 and routing device 120 and thereby may capture data packets, like data packets 140, via an inline network traffic capture at traffic capture point 165.

Network captured traffic distribution device 130 may be enabled to perform various manipulations and/or modifications of data packets 140 thereby producing a data packet 145. Further details regarding the manipulation and/or modification of data packets are provided below with reference to FIGS. 3A-10. Network captured traffic distribution device 130 may communicate modified data packet 145 to an external device 150 via, for example, an egress port. Exemplary external devices 150 include network monitors and network analyzing devices.

System 100 may also include a Global Positioning System (GPS) receiver 170. GPS receiver 170 may receive a GPS signal from one or more sources and may transmit this signal to network captured traffic distribution device 130. Network captured traffic distribution device 130 may incorporate a time value derived from the GPS signal into a time stamp inserted into a data packet, like data packet 140, in order to generate data packet 145.

Figure 2:
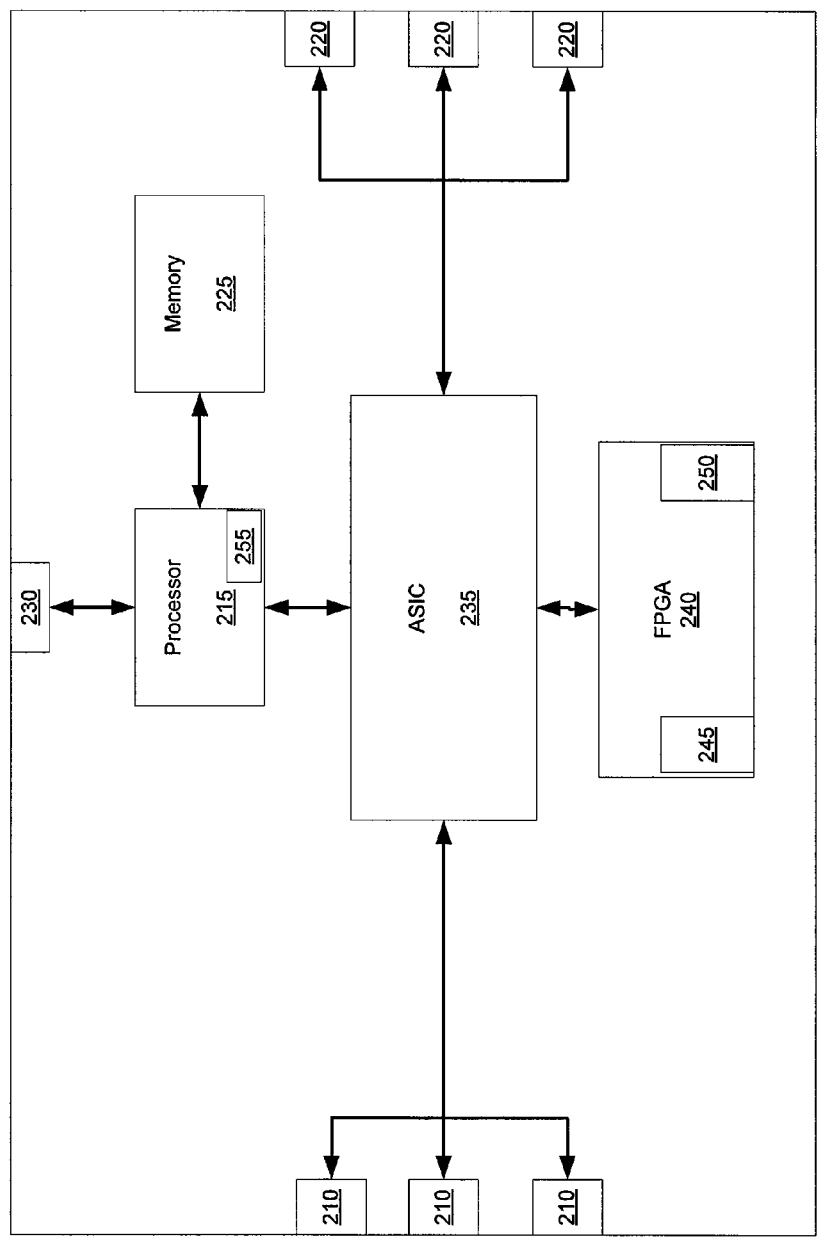
FIG. 2 is a block diagram depicting a network captured traffic distribution device, in accordance with an embodiment of the present invention.

FIG. 2 is a block diagram depicting network captured traffic distribution device 130 capable of executing any of the methods herein described. Network captured traffic distribution device 130 includes a plurality of ingress ports 210 and a plurality of egress ports 220. One or more ingress ports 210 and/or egress ports to 220 may be configured to operate in duplex and/or half-duplex mode. One or more egress ports 220 may be configured as a monitoring and/or stacking port. Data packets such as data packet 140 may be received by network captured traffic distribution device 130 via one or more ingress port 210. Data packets may be received from, for example, a mirror port, like mirror port 160, and/or an inline traffic capture point, like inline traffic capture point 165.

Received data packets may be forwarded from an ingress port 210 to an application specific integrated circuit (ASIC) 235 communicatively coupled to ingress port 210. ASIC 235 may perform a switching function and may forward a received data packet to a processor 215, and egress port 220, and/or an ingress port 210. ASIC 235 may also manipulate a received data packet according to one or more instructions stored in, for example, memory 225.

Processor 215 may be coupled to ASIC 235, a memory 225, and/or a management port 230. Processor 215 may be any appropriate processing or central processing unit (CPU) device. Processor 215 may process or receive data packets according to one or more instructions resident in memory 225. Processor 215 may be enabled to manipulate the data included in a data packet, such as data packet 140. Exemplary manipulations include inserting a port stamp into a data packet, inserting a time stamp into a data packet, removing a predefined segment from a data packet, truncating a data packet, inserting new data into a data packet, and/or modifying a predefined segment of the data packet. Processor 215 may also calculate a new frame check sequence (FCS) and/or a cyclic redundancy check (CRC) to be incorporated into a data packet, like data packet 145. Processor 215 may be managed by, for example, a user and/or administrator, like user/administrator 155 via, for example, a management port, like management port 230.

Memory 225 may be any appropriate data storage device, like static random access memory (SRAM), dynamic random access memory (DRAM), read-only memory (ROM), flash memory, a magnetic computer storage device (e.g. hard disk, floppy disk, and magnetic tape), and optical media and may store one or more instructions executable by processor 215 and/or ASIC 235.

System 100 may include a field programmable gate array (FPGA) 240 coupled to ASIC 235. FPGA 240 may include a first counter 245 and a second counter 250. FPGA 240 may be enabled to manipulate the data included in a data packet, such as data packet 140. Exemplary manipulations include inserting a port stamp into a data packet, inserting a time stamp into a data packet, removing a predefined segment from a data packet, truncating a data packet, inserting new data into a data packet, and/or modifying a predefined segment of the data packet. FPGA 240 may also calculate a new frame check sequence (FCS) and/or a cyclic redundancy check (CRC) to be incorporated into a data packet, like data packet 145.

In one embodiment, two counters, such as first counter 245 and second counter 250, may be resident in and/or maintained by a network captured traffic distribution device like network captured traffic distribution device 130, or a FPGA, like FPGA 240. First counter 245 and/or second counter 250 may each maintain a value of, for example, 32 bits in length. First counter 245 may, for example, maintain a value equal to the number of seconds that have passed since an arbitrarily chosen date, like Jan. 1, 1980. First counter 245 may be adapted such that it may be initialized to a value of zero after a reset operation is performed and may be further adapted to be loaded with an initial value and/or a system time by an external device from, for example, a processor like processor 215. These adaptations may allow the processor to load a system time into first counter 245.

A system time may be maintained by, for example, processor 215 or a device external to the processor. In some embodiments, a time value loaded onto first counter 245 may be sourced from and/or calibrated by an external timer or timing source like GPS receiver 170. A time value may also be received from a port timer associated with, for example, an ingress port via which a data packet is received.

Second counter 250 may, for example, count an interval representing a fraction of a currently elapsing time interval, and may be represented as a decimal integer. In some cases, the time interval may be a millisecond, a microsecond, or a nanosecond. The second counter may reset when a complete time interval has elapsed (i.e., a decimal value of 1,000 or greater for milliseconds, 1,000,000 or greater for microseconds or 1,000,000,000 or greater for nanoseconds) and first counter 245 may be incremented by, for example, a value of 1.

Second counter 250 may be incremented according to a frequency of incrimination of a clock, maintained by, for example, a processor, a system clock, or a GPS receiver. A frequency of incrimination of a clock may also be referred to as a clock cycle and an incrimination of a clock may be referred to as a tick. A clock cycle may or may not directly correspond to an interval of time and may vary from clock to clock. The number of increments added to second counter 250 per tick may vary depending on, for example, a clock cycle of a clock transmitting a signal to second counter 250. In this case, receipt, by second counter 250, of a signal from a clock indicating a tick may result in a triggering of an adder to add a number of increments representative of the tick to second counter 250, rather than simply incrementing the count value of second counter 250 by 1. For example, a 50 MHz clock advances one increment every 20 ns, thus the clock cycle of the 50 MHz clock is 20 ns and each tick of the 50 MHz clock represents 20 ns. Thus, each tick of the 50 MHz clock may cause an addition of 20 ns to second counter 250.

A clock transmitting ticks to first counter 245 and/or second counter 250 may be subject to various inaccuracies that may, in turn, affect the accuracy of the interval in which ticks are transmitted. For example, some system clocks suffer from inaccuracies on the order of +/−500 ns within a single second while the accuracy of other types of clocks, such as crystal oscillators gradually becomes more inaccurate over time. Various time increment validation procedures may be performed in order to correct for such inaccuracies. For example, a running sample of ticks may be analyzed to determine whether there are any inaccuracies in the interval at which ticks are delivered. From this analysis, an offset may be determined such that, an offset value is used to adjust an incremental adder of second counter 250 every n clock cycles. The incremental adder may be resident in, for example, second counter 250 or an FPGA, like FPGA 240. Thus, the adder may increment by, for example, 19 ns every n clock cycles to slow down a clock, or by, for example, 21 ns every n clock cycles to speed up a clock.

FIG. 3A is a block diagram illustrating an exemplary data packet 301. Data packet 301 includes a header 315, a payload 320, and a FCS/CRC 322 and may resemble data packet 140. Exemplary header 315 may include, for example, address information and other information, as needed, for the transmission of data packet 301 through a network communication system, like network communication system 100. Payload 320 may include any payload or data appropriate for data packet 301. FCS/CRC 322 may include frame check sequence (FCS) and/or cyclic redundancy check (CRC) information necessary for compliance with one or more system protocols, communication protocols, and/or the routing of the packet through a network communication system, like network communication system 100.

FIG. 3B is a block diagram illustrating an exemplary modified data packet 302 including header 315, payload 320, a port stamp 330, and a new FCS/CRC 325. In some cases, modified data packet 302 may be a modified form of data packet 301 and/or 140 and may resemble data packet 145. Modified data packet 302 may be generated via a process for inserting a port stamp into a data packet, like process 400, which is discussed below with reference to FIG. 4. Port stamp 330 may be a segment of data that indicates an ingress port identity associated with a data packet received by, for example, a network captured traffic distribution device, like network captured traffic distribution device 130. Although FIG. 3B indicates that port stamp 330 is inserted immediately prior to new FCS/CRC 325, port stamp 330 may be inserted into any location within modified data packet 302.

FIG. 3C is a block diagram illustrating a modified data packet 303 including header 315, payload 320, a time stamp 335, and new FCS/CRC 325. Modified data packet 303 may be a modified form of data packet 301 and/or 140 and may resemble data packet 145. In some cases, modified data packet 303 may be generated via a process for inserting a time stamp into a data packet, like process 500, which is discussed below with reference to FIG. 5. Time stamp 315 may be a segment of data that indicates an arrival time of a data packet at a network captured traffic distribution device, like network captured traffic distribution device 130. New FCS/CRC 325 may include a frame check sequence and/or cyclic redundancy check that is modified to incorporate the information inserted into modified data packet 303. Although FIG. 3C indicates that time stamp 335 is inserted immediately prior to new FCS/CRC 325, time stamp 335 may be inserted into any location within modified data packet 303.

FIG. 3D is a block diagram illustrating an exemplary modified data packet 304 including header 315, payload 320, time stamp 335, port stamp 330, and new FCS/CRC 325. In some cases, modified data packet 304 may be a modified form of data packets 140, 301, 302, and/or 303 and may resemble data packet 145. New FCS/CRC 325 may be modified to indicate the port stamp and time stamp that has been added to data packet 304. Although FIG. 3D indicates that port stamp 330 is inserted immediately prior to new FCS/CRC 325, and time stamp 335 is inserted immediately prior to port stamp 330, port stamp 330 and time stamp 335 may be inserted into any location within modified data packet 304. In some cases, modified data packet 304 may be generated via a process for inserting a time stamp and/or a port stamp into a data packet, like process 600, which is discussed below with reference to FIG. 6.

Figure 3E:
FIG. 3E is a block diagram depicting a data packet including a predefined segment, in accordance with an embodiment of the present application.

FIG. 3E is a block diagram illustrating a data packet 305 including header 315, predefined segment 340, a payload 320 and FCS/CRC 322. Data packet 305 may resemble data packet 301 and/or data packet 140. Predefined segment 340 may include any segment of data packets that may be of interest to, for example, a user and/or administrator, like user/administrator 155, of a network captured traffic distribution device, like network captured traffic distribution device 130, and/or a system like system 100. Predefined segment 340 may be of any length, including for example, the entire payload 320, header 315, FCS/CRC 322 and/or any portion thereof. Predefined segment may be located at any position within data packet 305, including, for example, header 315, payload 320, and/or FCS/CRC 322. Exemplary content included in a predefined segments include multi-protocol label switching (MPLS) information, VLAN tags, GPRS tunneling protocol (GTP) information for a GTP header, corrupted data, address information, and/or data type. Although FIG. 3E indicates that predefined segment 340 is located immediately after header 315, predefined segment 340 may be located at any position within data packet 305.

Figure 3F:
FIG. 3F is a block diagram depicting a data packet with a deleted predefined segment, in accordance with an embodiment of the present application.

FIG. 3F is a block diagram illustrating a modified data packet 306 including header 315, payload 320, and new FCS/CRC 325 wherein predefined segment 340 has been deleted. Modified data packet 306 may be a modified form of data packet 301 and/or 305 and may resemble modified data packet 145. New FCS/CRC 325 may indicate contents of modified data packet 306 without predefined segment 340. In some cases, modified data packet 306 may be generated via a process for modifying a predefined segment included in a data packet, like process 700, which is discussed below with reference to FIG. 7.

FIG. 3G is a block diagram illustrating a truncated data packet 307 including header 315, predefined segment 340, and new FCS/CRC 325. Truncated data packet 308 may be a modified form of data packet 140, 301, 305, and/or 306 arid may resemble data packet 145. As shown, data packet 307 has been truncated to remove payload 320. However, data packet 307 may be truncated to include any amount of data. For example, a truncated data packet 307 can include only header 315, only new FCS/CRC 325, only a portion of payload 320, and/or a portion thereof. New FCS/CRC 325 may indicate the truncated form of data packet 307. In some cases, modified data packet 307 may be generated via a process for truncating a data packet, like process 800, which is discussed below with reference to FIG. 8.

FIG. 3H is a block diagram illustrating an exemplary modified data packet 308 that includes header 315, new data segment 345, payload 320 and new FCS/CRC 325. Modified data packet 309 may be a modified form of data packet 140, 301, and/or 305 and may resemble data packet 145. New data segment 345 may include, for example, any data a user and/or administrator, like user/administrator 155, of a network captured traffic distribution device, like network captured traffic distribution device 130, and/or a system like system 100 may desire to insert into a data packet like data packet 140, 301, and/or 305. For example, new data segment 345 may include address information, a time of arrival, an ingress port identity, an egress port identity, and a VLAN tag. Although FIG. 3H indicates that new data segment 345 is inserted immediately after header 315, new data segment 345 may be inserted into any location within modified data packet 308. In some cases, modified data packet 308 may be generated via a process for inserting a new data segment into a data packet, like process 900, which is discussed below with reference to FIG. 9.

FIG. 3I is a block diagram illustrating a modified data packet 309 including header 315, modified predefined segment 350, payload 320 and new FCS/CRC 325. Modified data segment 350 may be a modified form of data packet 140, 301, and/or 305 and may resemble modified data packet 145. Modified predefined segment 350 may be a modified form of, for example, predefined segment 340 and may be modified according to, for example, a desire of a user and/or administrator, like user/administrator 155, of a network captured traffic distribution device, like network captured traffic distribution device 130, and/or a system like system 100. Although FIG. 3H indicates that modified predefined segment 350 is inserted immediately after header 315, modified predefined segment 350 may be inserted into any location within modified data packet 308. In some cases, modified data packet 309 may be generated via a process for modifying a data segment of a data packet, like process 1000, which is discussed below with reference to FIG. 10.

Figure 4:
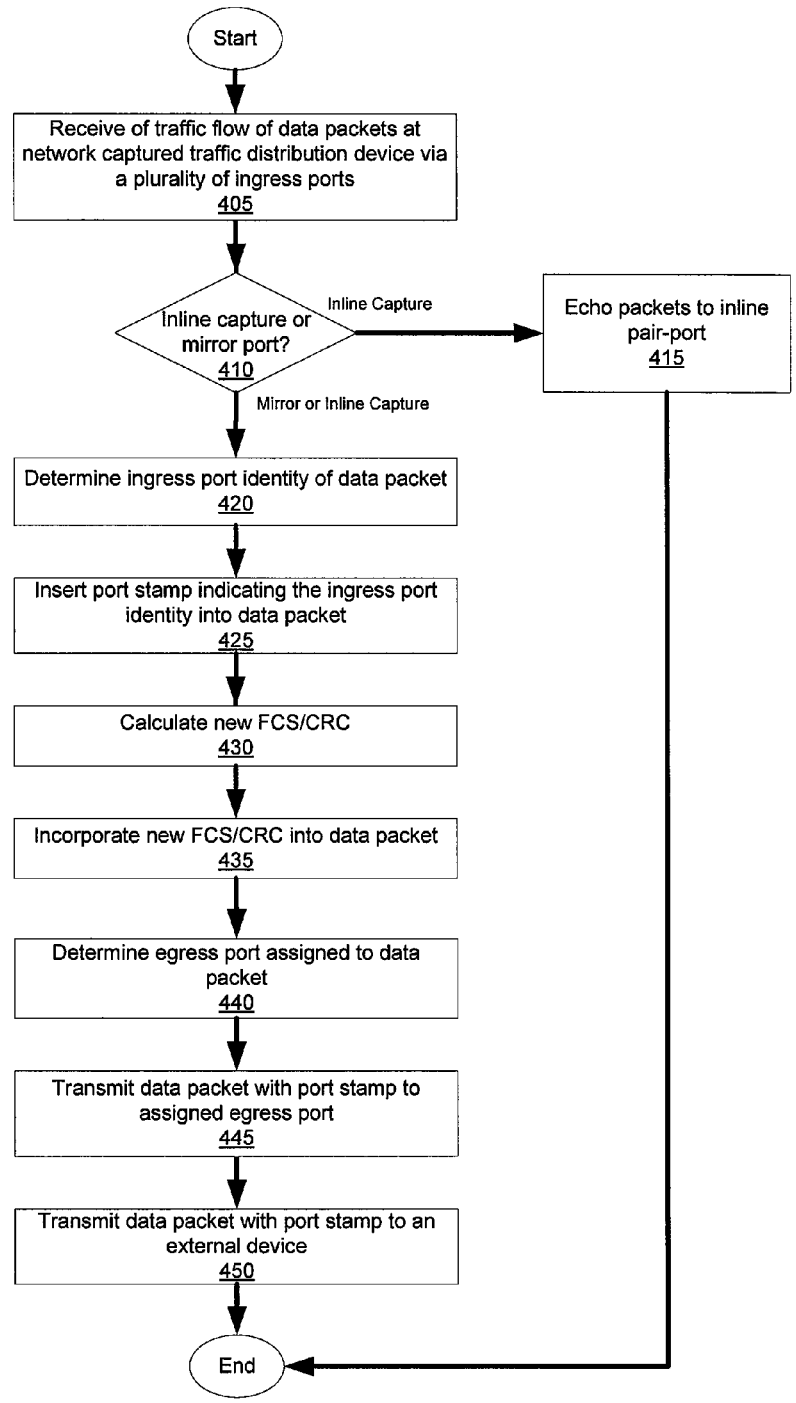
FIG. 4 is a flow chart depicting a process for inserting a port stamp into a data packet, in accordance with an embodiment of the present invention.

FIG. 4 is a flow chart illustrating a process 400 for inserting a port stamp, like port stamp 330, into a data packet such as data packet 140, 301, and/or 305. Process 400 may be performed by, for example, a network communication system like network communication system 100, a network captured traffic distribution device like network captured traffic distribution device 130, and/or an FPGA like FPGA 240. A data packet generated and/or modified by an execution of process 400 may resemble, for example, data packet 145 and/or 302.

In step 405, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 410, it may be determined whether a data packet is received via an inline capture point or a mirror port. When a data packet is received via an inline capture point the data packet may be echoed to an inline pair-port resident on, for example, a network captured traffic distribution device like network captured traffic distribution device 130 (step 415). In some embodiments, an inline pair-port may be an egress port resident in, for example, the network captured traffic distribution device.

When the data packets are received via a mirror port or an inline capture point, the data packets may be analyzed to determine an ingress port by which they were received, or an ingress port identity (step 420). Once an ingress port identity associated with the data packet is determined, a port stamp identifying the ingress port identity may be inserted into the data packet (step 425). In some embodiments a port stamp may be an 8 bit user-configurable value. In a case where a data packet includes an FCS and/or a CRC the port stamp may be inserted immediately preceding the FCS and/or CRC.

In step 430, a new FCS and/or CRC may be calculated in order to reflect the insertion of a port stamp into the data packet. In step 435, the new FCS and/or CRC may be inserted into the data packet. In step 440, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 445, the data packet with the port stamp may be transmitted by, for example, a network captured distribution device like network captured traffic distribution device 130 or an ASIC like ASIC 235 to its assigned egress port for eventual transmission to an external device, like external device 150 (step 450).

Figure 5:
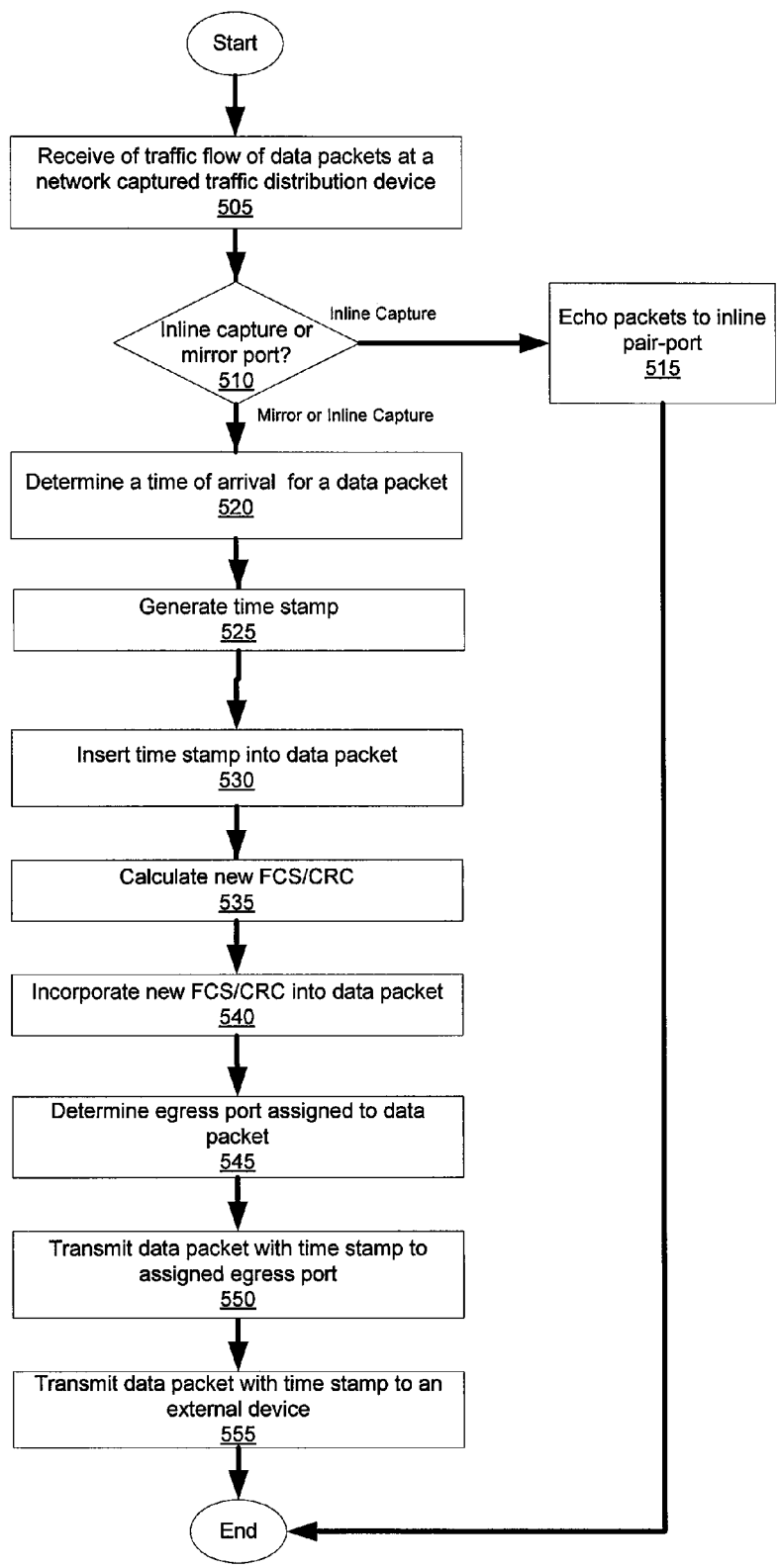
FIG. 5 is a flow chart depicting a process for inserting a time stamp into a data packet, in accordance with an embodiment of the present application.

FIG. 5 is a flow chart illustrating a process 500 for inserting a time stamp, like time stamp 335 into a data packet such as data packet 140, 301, and/or 305. Process 500 may be performed by, for example, a network communication system like network communication system 100, a network captured traffic distribution device like network captured traffic distribution device 130, and/or an FPGA like FPGA 240. A data packet generated and/or modified by an execution of process 500 may resemble, for example, data packet 145 and/or 303.

In step 505, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like inline traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 510, it may be determined whether a data packet is received via an inline capture point or a mirror port. When a data packet is received via an inline capture point, the data packet may be echoed to an inline pair-port resident on, for example, a network captured traffic distribution device like network captured traffic distribution device 130 (step 515). In some embodiments, an inline pair-port may be an egress port resident in, for example, the network captured traffic distribution device.

When the data packet is received via a mirror port or an inline capture point, it may be analyzed to determine a time of arrival of the data packet (step 520). A time of arrival for a data packet may be indicative of, for example, a time that the data packet arrived at a network captured traffic distribution device and/or a data packet's position in a sequential traffic flow of data packets.

In step 525, a time stamp value may be generated. The generated time stamp value may be based on, for example, a time value transmitted by a system clock in communication with, for example, the system, the network captured traffic distribution device, and/or the FPGA, a port timer associated with the ingress port via which the data packet was received, a difference between the current time of arrival of the data packet and an arrival time of a previously received data packet, and a time value received from a GPS receiver like GPS receiver 170. Generating a time stamp value may also include receiving a value from a first and/or second counter such as first counter 245 and/or second counter 250 and, in some cases, combining these values together to generate a time stamp value. Generating the time stamp value may also include adjusting the value of the time stamp based on, for example, a perceived accuracy of the determination of the time stamp value. In step 530, the time stamp may be inserted into the data packets. In cases where the data packet includes an FCS and/or CRC the time stamp may be inserted immediately preceding the FCS and/or CRC.

In step 535, a new FCS and/or CRC may be calculated in order to reflect the insertion of a time stamp into the data packet. In step 540, the new FCS and/or CRC may be incorporated into the data packet. In step 545, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 550, the data packet with the time stamp may be transmitted by, for example, a network captured distribution device like network captured traffic distribution device 130 or an ASIC like ASIC 235 to its assigned egress port for eventual transmission to an external device like external device 150 (step 555). Following step 555, process 500 may end.

Figure 6:
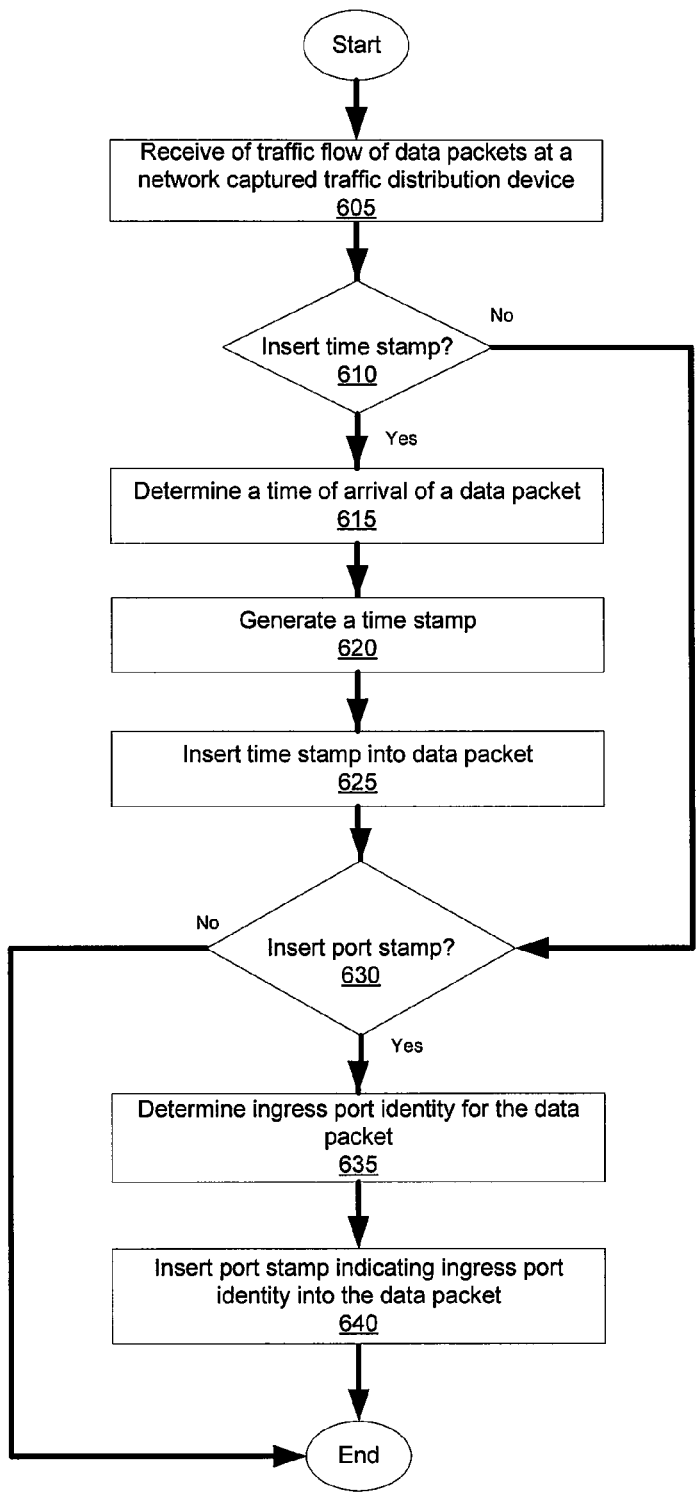
FIG. 6 is a flow chart depicting a process for inserting a time stamp and a port stamp into a data packet, in accordance with an embodiment of the present application.

FIG. 6 is a flow chart illustrating a process 600 for inserting a time stamp, like time stamp 335, and/or a port stamp, like port stamp 330, into a data packet, such as data packet 140, 301, 302, and/or 305. Process 600 may be performed by, for example, a network communication system like network communication system 100, a network captured traffic distribution device like network captured traffic distribution device 130, and/or an FPGA like FPGA 240. A data packet generated and/or modified by an execution of process 600 may resemble, for example, data packet 145 and/or 304.

In step 605, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 610, it is determined whether a time stamp is to be inserted into a data packet. The determination of step 610 may be made according to, for example, configuration information resident in the network captured traffic distribution device, and/or an analysis of a data packet according to a criterion such as a data packet's source, destination, or ingress port. If a time stamp is to be inserted, then a time of arrival of the data packet at the network captured traffic distribution device may be determined (step 615). Step 615 may resemble step 520. At step 620, a time stamp may be generated. Step 620 may resemble step 525. At step 625, a time stamp may be inserted into the data packet. Step 625 may resemble step 530.

When a time stamp is not to be inserted into a data packet and/or execution of step 625 is complete, it may be determined whether a port stamp is to be inserted into the data packet (step 630). The determination of step 630 may be made according to, for example, configuration information resident in the network captured traffic distribution device and/or an analysis of a data packet according to a criterion such as a data packet's source, destination, or ingress port. If a port stamp is not to be inserted into the data packet, process 600 may end. When a port stamp is to be inserted into the data packet, then an ingress port identity for the data packet may be determined. Step 635 may resemble step 420. In step 640, a port stamp identifying an ingress port identity may be inserted into the data packet. While the port stamp and/or time stamp may be inserted into any location of a data packet, in one embodiment wherein the data packet includes a FCS and/or CRC, the port stamp may be inserted immediately preceding the FCS and/or CRC and the time stamp may be inserted immediately preceding the port stamp. Following step 640, process 600 may end.

Figure 7:
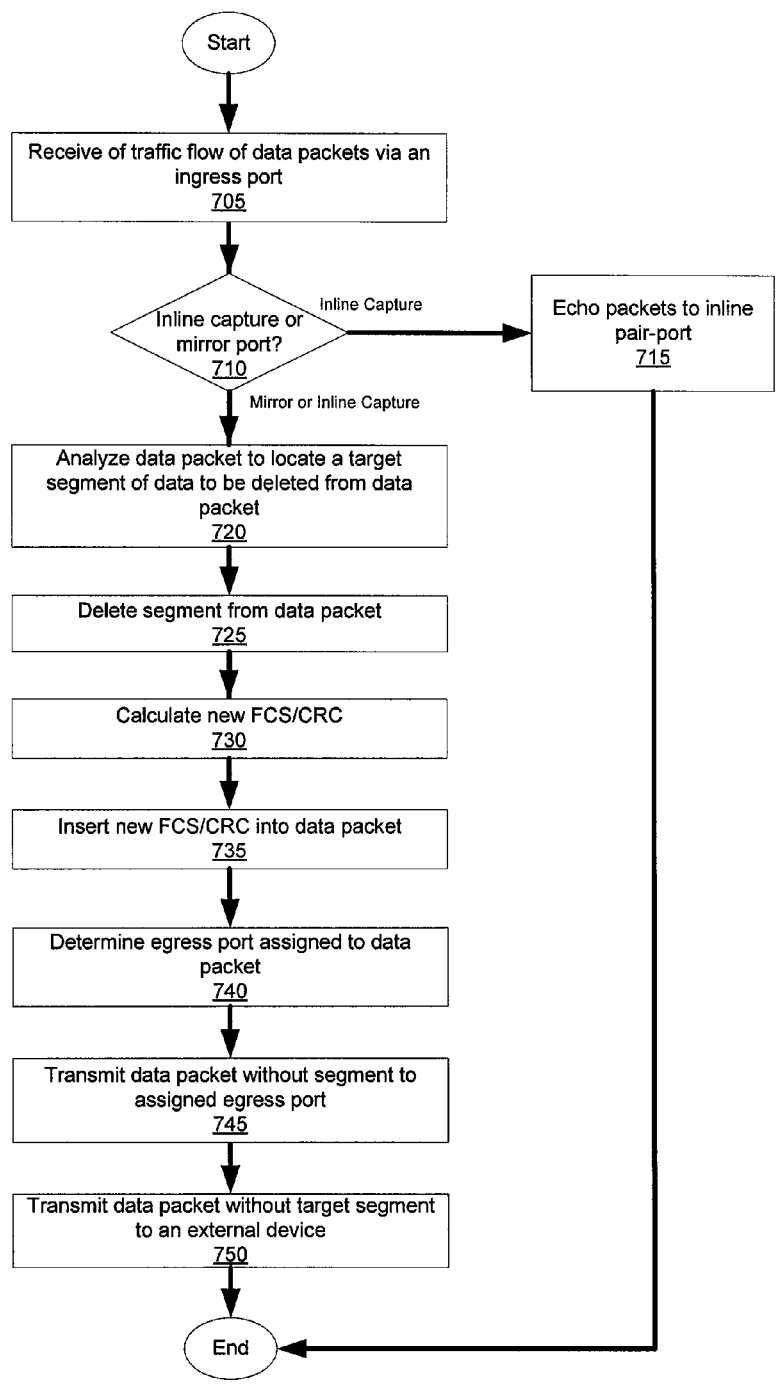
FIG. 7 is a flow chart depicting a process for deleting a predefined segment from a data packet, in accordance with an embodiment of the present invention.

FIG. 7 is a flow chart illustrating a process 700 for deleting a predefined segment from a data packet. Process 700 may be performed by, for example, a network communication system like network communication system 100, a network captured traffic distribution device like network captured traffic distribution device 130, and/or an FPGA like FPGA 240. A data packet generated and/or modified by an execution of process 700 may resemble, for example, data packet 145 and/or 306.

In step 705, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like inline traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 710, it may be determined whether a data packet is received via an inline capture point or a mirror port. When a data packet is received via an inline capture point the data packet may be echoed to an inline pair-port resident on, for example, a network captured traffic distribution device like network captured traffic distribution device 130 (step 715). In some embodiments, an inline pair-port may be an egress port resident in, for example, the network captured traffic distribution device.

When received from a mirror port or an inline capture, at step 720, the data packet may be analyzed to locate a predefined segment of data to be deleted from the data packet. Exemplary predefined segments to be deleted from a data packet include a VLAN tag, GTP information, and MPLS information. The analysis of step 720 may be performed by, for example, FPGA 240, ASIC 235, and/or processor 215 and may include, for example, counting in a pre-defined number of bits into a data packet and/or analyzing the data packet to locate the particular category or type of data within the data packet.

On some occasions, the analysis of step 720 may be performed in accordance with one or more contract terms, privacy policies, communication protocols, and/or laws, such as wire-tapping laws and exemplary predefined segments may include data that is deemed sensitive, or private, under one or more of the privacy policies, protocols, and/or laws. Exemplary sensitive data includes private conversations between two or more individuals, data categorized as "classified" or "top secret" by a governmental organization, data characterized as sensitive under a contract, like a non-disclosure agreement (NDA), and data classified as a trade secret by a business organization. Transmission of such sensitive information to an external device may violate, for example, one or more applicable contracts, privacy policies, communication protocols, and/or laws.

Once the predefined segment of data to be deleted is located, it may be deleted from the data packet (step 725). Deletion of the predefined segment may bring transmission of the data packet to an external device into compliance with, for example, one or more applicable contracts, privacy policies, communication protocols, and/or laws.

In step 730, a new FCS and/or CRC may be calculated in order to reflect the deletion of a predefined segment from the data packet. In step 735, the new FCS and/or CRC may be incorporated into the data packet. In step 740, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 745, the data packet without the deleted predefined segment may be transmitted by, for example, a network captured distribution device like network captured traffic distribution device 130 or an ASIC like ASIC 235 to its assigned egress port for eventual transmission to an external device like external device 150 (step 750). Following step 750, process 700 may end.

Figure 8:
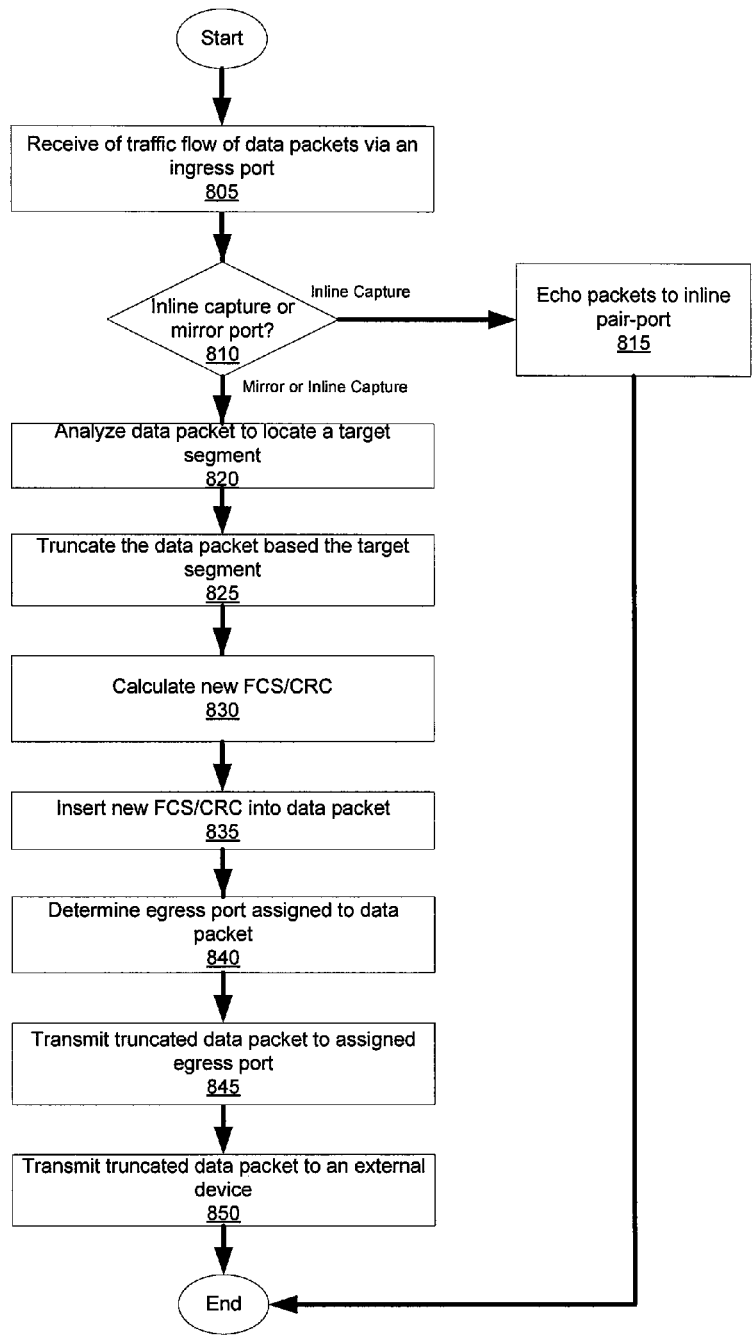
FIG. 8 is a flow chart depicting a process for truncating a data packet, in accordance with an embodiment of the present invention.

FIG. 8 is a flow chart illustrating a process 800 for truncating a data packet. Process 800 may be performed by, for example, a network communication system like network communication system 100, a network captured traffic distribution device like network captured traffic distribution device 130, and/or an FPGA like FPGA 240. A data packet generated and/or modified by an execution of process 800 may resemble, for example, data packet 145 and/or 307.

In step 805, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like inline traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 810, it may be determined whether a data packet is received via an inline capture point or a mirror port. When a data packet is received via an inline capture point the data packet may be echoed to an inline pair-port resident on, for example, a network captured traffic distribution device like network captured traffic distribution device 130 (step 815). In some embodiments, an inline pair-port may be an egress port resident in, for example, the network captured traffic distribution device.

When received from a mirror port or an inline capture, at step 820, the received data packet resembling, for example, data packet 305, may be analyzed to locate a predefined segment that may resemble, for example, predefined segment 340. Exemplary predefined segments may include header information such as header 315, a VLAN tag, GTP information, and MPLS information and/or certain types or categories of information. The analysis of step 820 may be performed by, for example, FPGA 240, ASIC 235, and/or processor 215 and may include, for example, counting in a pre-defined number of bits into a data packet and/or analyzing the data packet to locate the particular category or type of data within the data packet.

On some occasions, the analysis of step 820 may be performed in accordance with one or more contract terms, privacy policies, communication protocols, and/or laws, such as wire-tapping laws and exemplary predefined segments may include data that is not deemed sensitive, or private, under one or more of the privacy policies, protocols, and/or laws. Exemplary sensitive data includes private conversations between two or more individuals, data categorized as "classified" or "top secret" by a governmental organization, data characterized as sensitive under a contract, like a non-disclosure agreement (NDA), and data classified as a trade secret by a business organization. Transmission of such sensitive information to an external device may violate, for example, one or more applicable contracts, privacy policies, communication protocols, and/or laws.

Once the predefined segment is located, the data packet may be truncated to include, for example, only the predefined segment, header, and/or FCS/CRC (step 825). Truncating the data packet to include only the predefined segment, header, and/or FCS/CRC may bring transmission of the data packet to an external device into compliance with, for example, one or more applicable contracts, privacy policies, communication protocols, and/or laws.

In step 830, a new FCS and/or CRC may be calculated in order to reflect the truncation of the data packet. In step 835 the new FCS and/or CRC may be incorporated into the data packet. In step 840, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 845, the data packet with the port stamp may be transmitted by, for example, a network captured distribution device like network captured traffic distribution device 130 or an ASIC like ASIC 235 to its assigned egress port for eventual transmission to an external device like external device 150 (step 850).

Figure 9:
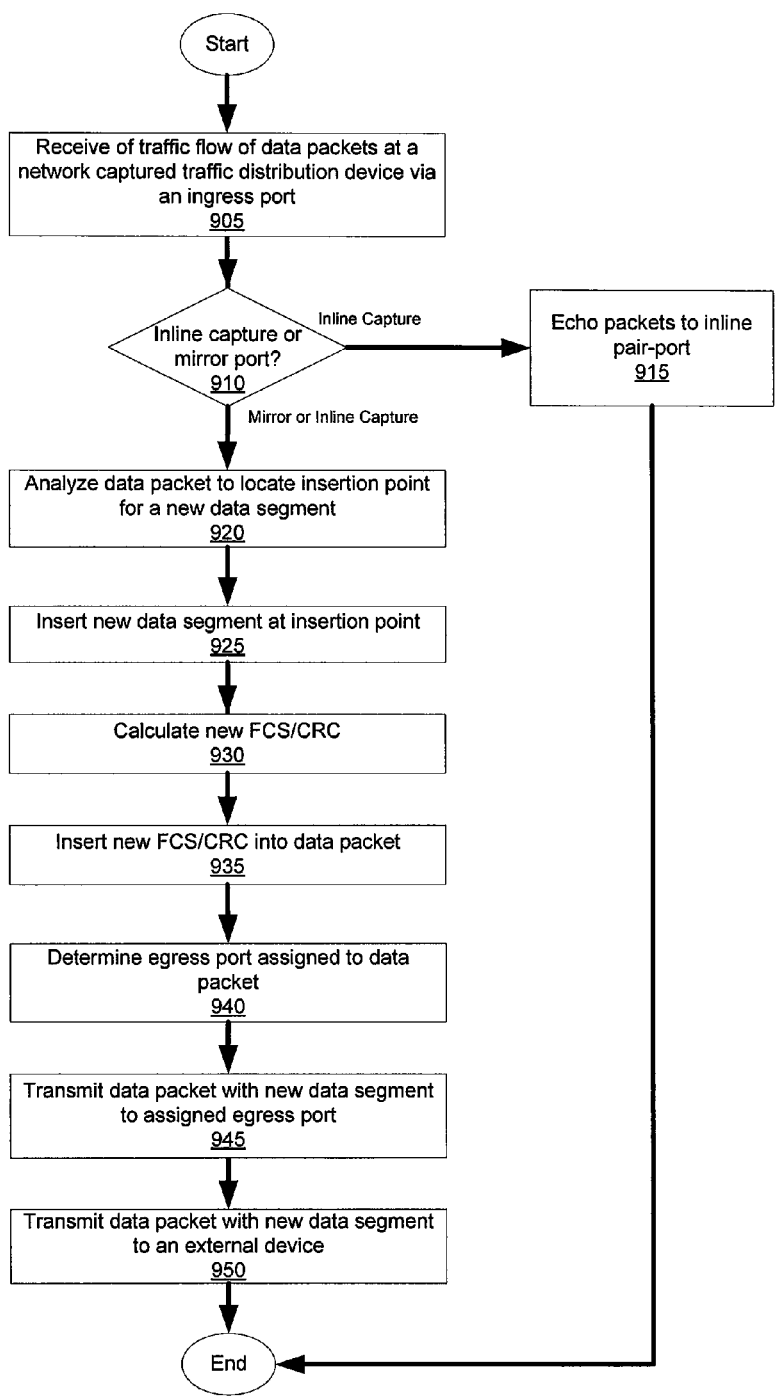
FIG. 9 is a flow chart depicting a process for inserting a new data segment into a data packet, in accordance with an embodiment of the present invention.

FIG. 9 is a flow chart illustrating a process 900 for inserting a new data segment into a data packet. Process 900 may be performed by, for example, a network communication system like network communication system 100, a network captured traffic distribution device like network captured traffic distribution device 130, and/or an FPGA like FPGA 240. A data packet generated and/or modified by an execution of process 900 may resemble, for example, data packet 145 and/or 308.

In step 905, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like inline traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 910, it may be determined whether a data packet is received via an inline capture point or a mirror port. When a data packet is received via an inline capture point, the data packet may be echoed to an inline pair-port resident on, for example, a network captured traffic distribution device like network captured traffic distribution device 130 (step 915). In some embodiments, an inline pair-port may be an egress port resident in, for example, the network captured traffic distribution device.

When received from a mirror port or an inline capture, at step 920, the received data packet resembling data packet 140 and/or 301 may be analyzed to locate an insertion point for a new data segment. Exemplary new data segments include a new VLAN tag, MPLS information, source information, destination information, filtering information, a time stamp, a port stamp, and/or additional tracking information. In some cases, the new information will be pre-generated. Once an insertion point is located, a new data segment, like new data segment 345, may be inserted at the insertion point (step 925).

In step 930, a new FCS and/or CRC may be calculated in order to reflect the insertion of a new data segment into the data packet. In step 935, the new FCS and/or CRC may be incorporated into the data packet. In step 940, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 945, the data packet with the new data segment may be transmitted by, for example, a network captured distribution device like network captured traffic distribution device 130 or an ASIC like ASIC 235 to its assigned egress port for eventual transmission to an external device like external device 150 (step 950). Following step 950, process 900 may end.

Figure 10:
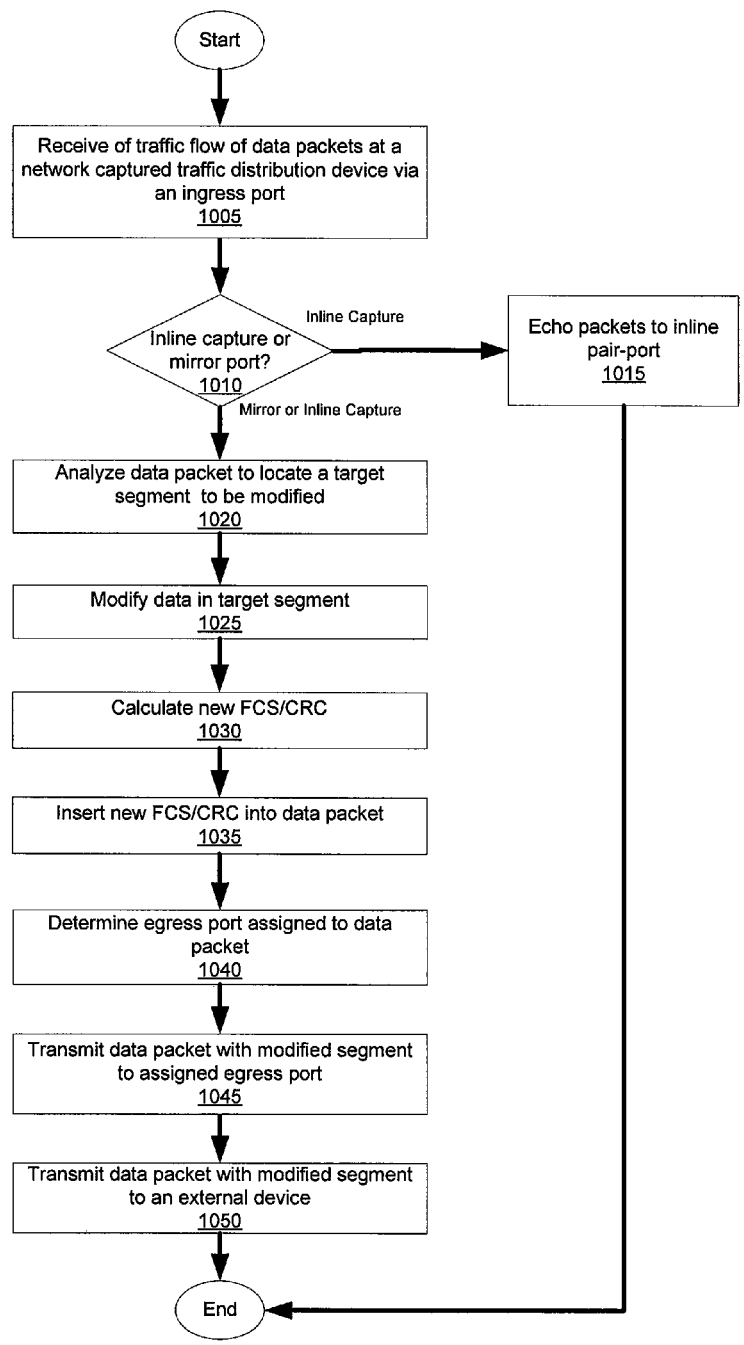
FIG. 10 is a flow chart depicting a process for modifying a data segment included in a data packet, in accordance with an embodiment of the present invention.

FIG. 10 is a flow chart illustrating a process 1000 for modifying a predefined segment of data included in a data packet like data packet 301, 305, and/or 140. Process 1000 may be performed by, for example, a network communication system like network communication system 100, a network captured traffic distribution device like network captured traffic distribution device 130, and/or an FPGA like FPGA 240. A data packet generated and/or modified by an execution of process 1000 may resemble, for example, data packet 145 and/or 309.

In step 1005, a traffic flow of captured data packets may be received by, for example, a network communication system like network communication system 100, a network captured traffic distribution device like network captured traffic distribution device 130, and/or an FPGA like FPGA 240. The traffic flow of data packets may be received via, for example, a mirror port like mirror port 160 and/or a traffic capture point located along a communication link between two communicating devices like inline traffic capture point 165. The traffic flow of data packets may be received at a rate of, for example, ten Mega bites per second, one hundred Mega bites per second, one Gigabit per second, ten Gigabits per second, 40 Gigabits per second, 40 Gigabits per second via dense wavelength-division multiplexing, and 100 Gigabits per second.

In step 1010, it may be determined whether a data packet is received via an inline capture point or a mirror port. When a data packet is received via an inline capture point the data packet may be echoed to an inline pair-port resident on, for example, a network captured traffic distribution device like network captured traffic distribution device 130 (step 1015). In some embodiments, an inline pair-port may be an egress port resident in, for example, a network captured traffic distribution device.

When received from a mirror port or an inline capture, at step 1020, the received data packet may be analyzed to locate a predefined segment of data, like predefined segment 340, and to be modified. Exemplary predefined segments to be modified header information such as header 315, a VLAN tag, GTP information, and MPLS information, and/or any other data present in the data packet which a user, such as user/administrator 155, may wish to modify. The analysis of step 1020 may be performed by, for example, FPGA 240, ASIC 235, and/or processor 215 and may include, for example, counting in a pre-defined number of bits into a data packet and/or analyzing the data packet to locate the particular category or type of data within the data packet.

On some occasions, the analysis of step 1020 may be performed in accordance with one or more contract terms, privacy policies, communication protocols, and/or laws, such as wire-tapping laws and exemplary predefined segments may include data that is deemed sensitive, or private, under one or more of the privacy policies, protocols, and/or laws. Exemplary sensitive data includes private conversations between two or more individuals, data categorized as "classified" or "top secret" by a governmental organization, data characterized as sensitive under a contract, like a non-disclosure agreement (NDA), and data classified as a trade secret by a business organization. Transmission of such sensitive information to an external device may violate, for example, one or more applicable contracts, privacy policies, communication protocols, and/or laws.

In step 1025, the data included in the predefined segment may be modified to generate a modified predefined segment such as modified predefined segment 350. Once the predefined segment is located, the data packet may be modified to include, for example, a modified predefined segment such as modified predefined segment 350. In some instances, modification of the predefined segment may bring transmission of the data packet to an external device into compliance with, for example, one or more applicable contracts, privacy policies, communication protocols, and/or laws.

In step 1030, a new FCS and/or CRC may be calculated in order to reflect the modification of a predefined segment. In step 1035, the new FCS and/or CRC may be incorporated into a data packet. In step 1040, an egress port, like egress port 220, assigned to the data packet may be determined. This determination may be based on, for example, configuration information resident in, for example, a device receiving the traffic flow of data packets. In some cases an egress port assigned to a data packet may be a monitor port. In step 1045, the data packet with the modified predefined segment may be transmitted by, for example, a network captured distribution device like network captured traffic distribution device 130 or an ASIC like ASIC 235 to its assigned egress port for eventual transmission to an external device like external device 150 (step 1050).

Thus various apparatus, systems, and methods for modifying a data packet have been herein described.

What is claimed is:

1. A method comprising:
   receiving, at a network captured traffic distribution device, a traffic flow of captured data packets wherein the data packets are received via at least one of a minor port resident on a source of the captured data packets and a traffic capture point located along a communication link between two communicating devices, further wherein the network traffic distribution device includes a plurality of ingress and egress ports;
   determining, by the network captured traffic distribution device, a time of arrival of a data packet included in the traffic flow of captured data packets at the network captured traffic distribution device;
   generating, by the network captured traffic distribution device, a time stamp value based on the determination including receiving a value from a first counter, receiving a value from a second counter and combining the values from the first and second counters;
   inserting, by the network captured traffic distribution device, the generated time stamp into the data packet;
   determining, by the network captured distribution device, an egress port assigned to the data packet; and
   transmitting, by the network captured distribution device, the data packet, including the time stamp, to the assigned egress port.

2. The method of claim 1, wherein the generated time stamp value is based on at least one of a system clock in communication with the network captured traffic distribution device, a port timer associated with an ingress port via which the data packet is received, a difference between a current time of arrival of the data packet and an arrival time of a previously received data packet, a time value received from a system clock, and a time value received from a global positioning receiver (GPS Receiver).

3. The method of claim 1, wherein generating the time stamp includes:
   adjusting the time stamp value based on an accuracy level of the determined time of arrival of the data packet.

4. The method of claim 1, wherein the data packet includes at least one of a frame check sequence (FCS) and a cyclic redundancy check (CRC), further wherein the time stamp is inserted immediately preceding the at least one of the FCS and CRC.

5. The method of claim 1, wherein determining the egress port assigned to the data packet is based on configuration information stored on the network captured traffic distribution device.

6. The method of claim 1, wherein the egress port assigned to the data packet is a monitor port.

\* \* \* \* \*

UNITED STATES PATENT AND TRADEMARK OFFICE
CERTIFICATE OF CORRECTION

PATENT NO. : 8,665,869 B2
APPLICATION NO. : 12/959226
DATED : March 4, 2014
INVENTOR(S) : Terence M. Breslin et al.

It is certified that error appears in the above-identified patent and that said Letters Patent is hereby corrected as shown below:

In the Claims

At column 17, Claim number 1, line number 4, change "minor" to --mirror--

Signed and Sealed this
First Day of July, 2014

Michelle K. Lee
*Deputy Director of the United States Patent and Trademark Office*